R. P. SCOTT.
Improvement in Fruit-Parers.

No. 114,867.  Patented May 16, 1871.

Witnesses:
Sam. M. Bryan
John B. Kellogg

Inventor:
Robt. P. Scott

UNITED STATES PATENT OFFICE.

ROBERT P. SCOTT, OF CADIZ, OHIO.

IMPROVEMENT IN FRUIT-PARERS.

Specification forming part of Letters Patent No. 114,867, dated May 16, 1871.

*To all whom it may concern:*

Be it known that I, ROBERT P. SCOTT, of Cadiz, in the county of Harrison and State of Ohio, have invented a new and valuable Improvement in Fruit-Paring Machines, of which the following is a specification:

Nature and Objects of the Invention.

The first part of my invention relates to a revolving knife and the means for operating the same.

The second part of the invention relates to the peculiar construction of the fork, which is curved, and each prong in one solid piece of steel.

The third part relates to the arrangement of spring for operating the oscillating motion of the knife-stand.

Description of Accompanying Drawing.

Figure 1:
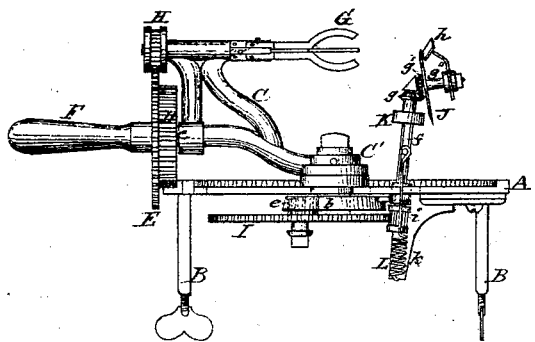
Figure 2:
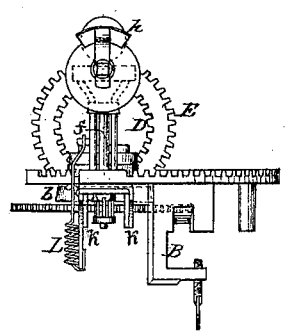
Figure 3:
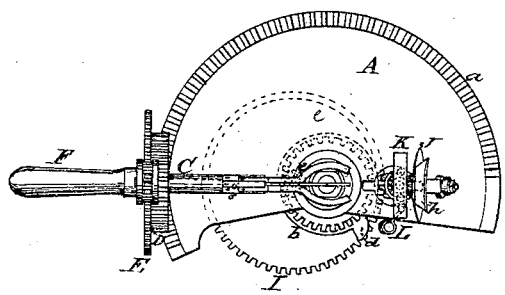

Figure 1 is a front view of the machine. Fig. 2 is a side view of the same. Fig. 3 is a plan of the same.

General Description.

A is a semicircular frame, with teeth $a$ on the upper and outer edges. It also has clamps B B, attached to the lower side, to fasten it to a table or other stationary board.

The main lever or bar C has a bearing at the point $c$, with a wheel, E, and large pinion D running thereon, and held to their place by the handle F. This wheel and pinion connect the motion with the fork G, which is supplied with a pinion, H, on the opposite end of the shaft.

The fork G has each prong in a separate piece, and is attached to the shaft by small holes and rivets $o$, and each held down by a spring, $o'$ $o'$.

The prongs are flat and curved, so that after slipping over the seed of a peach will hold it from being pushed off by the knife.

On the lower side of the machine is a wheel, $b$, which is connected by a journal running through the frame to the bar C, both revolving together. This wheel is cut in teeth on one-half of the inside of the periphery, and has a projection, $d$, on the outer edge, to push back the knife from the fruit when pared.

I is a wheel, operated by a pinion, $e$, gearing into the wheel $b$, which connects the motion with the knife J by gearing into a pinion, $i$, which is fastened to the shaft $f$, which has a bevel-wheel, $g$, on the upper end, which meshes into the bevel $g'$, running on the shaft $g''$. To the outer end of this shaft the guard $h$ is screwed, for the purpose of regulating the thickness of the paring. The guard $h$ also acts as an end piece to keep back the bevel-wheel $g'$, which carries the knife J, from working off its bearing.

The knife-rest K is supported by two pivots, opposite the wheel I, working into the brackets $k$ $k$, and has a pin projecting from one side, which acts as the upper bearing of the spring L.

The spring L is so constructed on a line from the pivots of the knife-stand that when the stand is forced back the spring acts as a stop; but upon being pushed forward it presses the knife firmly against the fruit in process of paring.

Claims.

I claim as my invention—

1. The revolving knife J in a fruit-paring machine, constructed substantially as and for the purpose set forth.

2. The fork G, constructed as shown and described, as and for the purpose herein specified.

3. The spring L, in combination with the knife-support K and bracket $k$, constructed and operating in the manner set forth.

4. The arrangement of the frame A, the gearing $b$ $e$ I $a$ D E H, bar C, fork G, knife J, when all constructed and operating substantially as and for the purpose herein described.

In testimony that I claim the above I sign my name in the presence of two witnesses.

ROBT. P. SCOTT.

Witnesses:
SAM. M. BRYAN,
JOHN B. KELLOGG.